(12) United States Patent
Fogtmann et al.

(10) Patent No.: US 11,787,158 B2
(45) Date of Patent: Oct. 17, 2023

(54) SHEET LAMINATE, A BLISTER PACKAGE AND A METHOD OF MANUFACTURE

(71) Applicant: Danapak Flexibles A/S, Slagelse (DK)

(72) Inventors: Torben Fogtmann, Nyborg (DK); Peter Johansen, Odense (DK); Lars Christensen, Slagelse (DK)

(73) Assignee: Danapak Flexibles A/S, Slagelse (DK)

( * ) Notice: Subject to any disclaimer, the term of this patent is extended or adjusted under 35 U.S.C. 154(b) by 0 days.

(21) Appl. No.: 16/755,813

(22) PCT Filed: Oct. 23, 2018

(86) PCT No.: PCT/EP2018/079018
§ 371 (c)(1),
(2) Date: Apr. 13, 2020

(87) PCT Pub. No.: WO2019/081496
PCT Pub. Date: May 2, 2019

(65) Prior Publication Data
US 2020/0269546 A1    Aug. 27, 2020

(30) Foreign Application Priority Data

Oct. 24, 2017 (EP) ..................................... 17198016

(51) Int. Cl.
*B32B 15/085*    (2006.01)
*B32B 15/20*    (2006.01)
(Continued)

(52) U.S. Cl.
CPC .............. *B32B 15/085* (2013.01); *B32B 3/30* (2013.01); *B32B 7/12* (2013.01); *B32B 15/09* (2013.01);
(Continued)

(58) Field of Classification Search
CPC ..... B32B 37/15; B32B 37/153; B32B 15/085; B32B 15/20; B32B 27/10; B32B 15/12;
(Continued)

(56) References Cited

U.S. PATENT DOCUMENTS 4,941,935 A * 7/1990 Gregory ................ B32B 15/085
156/244.11
5,145,737 A    9/1992 Boiron et al.
(Continued)

FOREIGN PATENT DOCUMENTS

DE    102010009369 A1    8/2011
EP    2 143 557 A1    1/2010
(Continued)

OTHER PUBLICATIONS

John R. Wagner Jr., Eldridge M. Mount III, and Harold F. Giles Jr., "Extrusion: The Definitive Processing Guide and Handbook". Second Edition. Elsevier Inc, 2013, Chapter 40 Coextrusion Applications, pp. 449-466; and Chapter 47 Extrusion Coating and Lamination, pp. 551-554. (Year: 2013).*
(Continued)

*Primary Examiner* — Monique R Jackson
(74) *Attorney, Agent, or Firm* — Holland & Hart LLP

(57) ABSTRACT

A sheet laminate for being used as a puncturable top web for a blister package, comprising: an aluminium base sheet layer; at least one tie layer comprising polyolefin; a welding layer comprising polyester or polypropylene; wherein the welding layer and the tie layer are coextrusion coated on the base sheet layer so that the at least one tie layer is disposed between the base sheet layer and the welding layer, whereby the welding layer is attached to the base sheet layer by the at least one tie layer. A blister package, wherein the sheet laminate is attached to a bottom web with product cavities. A method of manufacture of the sheet laminate and of the
(Continued)

blister package, wherein the coextrusion coating step of the manufacture of the blister package is carried out simultaneously with extrusion lamination of a paper layer.

18 Claims, 3 Drawing Sheets

(51) Int. Cl.
| | |
|---|---|
| B32B 27/10 | (2006.01) |
| B32B 27/32 | (2006.01) |
| B32B 27/36 | (2006.01) |
| B32B 37/15 | (2006.01) |
| B65D 75/32 | (2006.01) |
| B32B 7/12 | (2006.01) |
| B32B 15/09 | (2006.01) |
| B32B 15/12 | (2006.01) |
| B32B 3/30 | (2006.01) |
| A61J 1/03 | (2023.01) |
| B32B 3/26 | (2006.01) |

(52) U.S. Cl.
CPC .............. *B32B 15/12* (2013.01); *B32B 15/20* (2013.01); *B32B 27/10* (2013.01); *B32B 27/32* (2013.01); *B32B 27/36* (2013.01); *B32B 37/153* (2013.01); *B65D 75/327* (2013.01); *A61J 1/035* (2013.01); *B32B 3/263* (2013.01); *B32B 2255/06* (2013.01); *B32B 2255/26* (2013.01); *B32B 2307/718* (2013.01); *B32B 2439/80* (2013.01)

(58) Field of Classification Search
CPC ..... B32B 15/08; B32B 7/12; B32B 2307/582; B32B 27/08; B32B 15/09; B65D 75/32; B65D 75/325; B65D 75/327; B29K 2305/02; B29K 2505/02; B29K 2705/02; B29K 2905/02
See application file for complete search history.

(56) References Cited

U.S. PATENT DOCUMENTS

| | | | | |
|---|---|---|---|---|
| 6,212,858 | B1 | 4/2001 | Breitler | |
| 6,224,973 | B1* | 5/2001 | Trouilhet | B32B 7/06 |
| | | | | 428/340 |
| 7,798,359 | B1 | 9/2010 | Marsella | |
| 2002/0034649 | A1 | 3/2002 | Le Du et al. | |
| 2005/0037162 | A1* | 2/2005 | Adams | B32B 27/32 |
| | | | | 428/34.2 |
| 2005/0079307 | A1* | 4/2005 | Blum | B32B 27/08 |
| | | | | 428/35.8 |
| 2006/0257648 | A1* | 11/2006 | Nageli | B32B 15/08 |
| | | | | 428/327 |
| 2007/0068842 | A1* | 3/2007 | Pasbrig | B32B 27/36 |
| | | | | 206/532 |
| 2007/0122521 | A1* | 5/2007 | Degady | A23G 4/00 |
| | | | | 426/5 |
| 2008/0251411 | A1* | 10/2008 | Walker | B32B 29/02 |
| | | | | 206/531 |
| 2010/0170820 | A1* | 7/2010 | Leplatois | B32B 27/306 |
| | | | | 156/324 |
| 2011/0005961 | A1* | 1/2011 | Leplatois | B29C 48/08 |
| | | | | 156/60 |
| 2012/0018344 | A1* | 1/2012 | Brandl | B32B 27/32 |
| | | | | 428/344 |
| 2015/0283029 | A1* | 10/2015 | Riis | A61J 1/035 |
| | | | | 206/438 |
| 2016/0159541 | A1* | 6/2016 | Brandl | B65B 61/06 |
| | | | | 206/461 |
| 2020/0165045 | A1* | 5/2020 | Kondo | B65D 75/36 |
| 2021/0106497 | A1* | 4/2021 | Malovic | B32B 15/09 |

FOREIGN PATENT DOCUMENTS

| | | |
|---|---|---|
| WO | WO 01/17772 A1 | 3/2001 |
| WO | WO 2009/129955 A1 | 10/2009 |
| WO | WO 2009129955 A1 | 10/2009 |
| WO | WO 2012/062317 A1 | 5/2012 |
| WO | WO 2014/117776 A1 | 8/2014 |
| WO | WO 2016/086937 A1 | 6/2016 |

OTHER PUBLICATIONS

Adhesive Resins and Tie Layers, PolymerDatabase.com, retrieved from https://polymerdatabase.com/Films/Tie%20Layers.html on Mar. 9, 2022. (Year: 2022).*

Botros, Maged G., Harry Mavridis, and Francis M. Mirabella. "New developments in Plexar® tie-layer adhesives." Tappi Conference, May 2005. (Year: 2005).*

Zimmerman, An Introduction to Plexar® Tie-Layer Resins (Based on a paper presented at "Barrier Technology for the Packaging Industry," Society of Manufacturing Engineers, Chicago, 1998), retrieved from https://www.lyondellbasell.com on Mar. 9, 2022. (Year: 2022).*

Machine translation of WO2009129955A1, published Oct. 2009, Powered by EPO and Google. (Year: 2009).*

* cited by examiner

SHEET LAMINATE, A BLISTER PACKAGE AND A METHOD OF MANUFACTURE

CROSS-REFERENCE TO RELATED APPLICATIONS

The present application is a national phase entry of PCT Application No. PCT/EP2018/079018, entitled "A SHEET LAMINATE, A BLISTER PACKAGE, AND A METHOD OF MANUFACTURE," which was filed on 23 Oct. 2018, and claims the benefit of European Patent Application No. 17198016.2, entitled "A SHEET LAMINATE, A BLISTER PACKAGE, AND A METHOD OF MANUFACTURE," which was filed on 24 Oct. 2017. These applications are incorporated herein for all purposes.

FIELD OF THE DISCLOSURE

The present disclosure relates to a sheet laminate for being used as a puncturable top web for a blister package, comprising an aluminium base sheet layer.

BACKGROUND

A typical prior art blister package comprises a top web and a bottom web which are welded or adhered to each other. The bottom web comprises a number of cavities or pockets, each holding a packaged product for consummation by a user. This product is typically in the form of pills or tablets, such as for cosmetic, medicinal, pharmaceutical, nutritional or other use. The bottom web cavities are typically manufactured by cold or heat deformation, i.e. cold or heat pressing.

In peelable blister packages, the top web is peeled off of the bottom web by the user in order to gain access to product. In this case, the top web is typically sealed to the bottom web using an adhesive or glue in order to make the top web peelable. Alternatively, the adhesive or glue is included as an internal layer of the top web, and a bottom, welding layer of the top web is welded to the bottom web, in which case the top web delaminates in the adhesive layer in the welding area only. This type of blister package is often applied when the product does not have mechanical properties allowing for it to be pushed out by puncturing the top web.

In puncturable blister packages, the top web is welded to the bottom web using a bottom welding layer of the top web. In this case, the product is extracted from the cavity by pushing, e.g. with a finger, on a bottom surface of the cavity against the top web portion positioned above the cavity with enough force to puncture this top web portion so that the product held in the cavity is pushed out through the punctured opening or rupture of the top web portion.

In the prior art, top webs of the latter blister packages often comprise a non-annealed aluminium base sheet layer, typically of about 20 µm thickness. A sealing lacquer is applied as welding layer. A print layer is sometimes provided on the opposite side of the base sheet layer for facing the user.

Also known are sheet laminate top webs comprising typically 9 or 12 µm aluminium film with a paper layer adhered by an adhesive to a top surface thereof and a sealing layer applied as welding layer. A print is sometimes provided on the outer surface of the paper layer.

Other top webs apply plastic films as the base sheet layer, which may also be provided with a paper layer. These are often used for peelable top webs.

WO 2009/129955 A1 discloses a child-proof top web for blister packages consisting of a sheet laminate with an aluminium or plastic base sheet layer, which on a top surface is laminated by an adhesive to a cover layer and at a bottom surface comprises a heat sealing layer. A user gains access to the contained product by first peeling off the cover layer after which the product may be pushed out through the base sheet layer in order to provide child-proofness.

In the case of blister packages applying a puncturable top web, it is important that the adherence between the top web and the bottom web is of sufficient mechanical properties to allow a suitable portion of the top web to be punctured when the product is to be pushed out of the cavity, without the top web delaminating from the bottom web. Otherwise, the top web delaminates from the bottom web before rupture of the top web, which may make it difficult to extract the product from the package.

In puncturable blister packages, it is therefore common to apply a rather thick, non-annealed aluminium base sheet layer, typically above 10 µm. Non-annealed aluminium is brittle and less resilient and allows rupture to occur even in the case of a thick base sheet layer.

SUMMARY

On this background, it is an object of the present disclosure to provide a sheet laminate with suitable mechanical properties for being used as a puncturable blister package top web.

This and further objects may be achieved by the sheet laminate according to the present disclosure, which sheet laminate is for being used as a puncturable top web for a blister package, and comprises:

an aluminium base sheet layer;

at least one tie layer being of, comprising, essentially consisting of or based on polyolefin;

a welding layer being of, comprising, essentially consisting of or based on polyester or polypropylene;

wherein the welding layer and the at least one tie layer are coextrusion coated on the base sheet layer so that the at least one tie layer is disposed between the base sheet layer and the welding layer, whereby the welding layer is attached to the base sheet layer by means of the at least one tie layer.

Surprisingly, it has been found that such a sheet laminate manufactured by means of extrusion coating may be provided with a thin aluminium base sheet layer and/or with thin tie and/or welding layers, and with suitable mechanical properties for being used as a puncturable blister package top web. More specifically, the mechanical properties, such as puncture resistance and welding strength of the laminate to a suitable bottom web, may allow for a product contained in a blister package bottom web cavity, to which bottom web the sheet laminate has been welded, to be pushed out of the cavity through the laminate by means of puncture of the laminate as described in the above. It is surprising that it is possible to achieve this by means of a coextrusion coated welding layer since coextrusion coated laminates are usually resilient and have high mechanical properties. Also, sufficient barrier properties of the laminate according to the disclosure for use as a blister package top web is provided.

Due to the step of coextrusion coating, the sheet laminate will be stronger than a corresponding sheet laminate with a base sheet layer provided with welding lacquer, thereby allowing the thickness of the base sheet layer and the welding layer to be reduced accordingly. It has been found that surprisingly thin layers can be applied in the sheet laminate according to the disclosure, which may achieve significant savings of weight and material. Additionally, with the method according to the disclosure a sheet laminate with suitable barrier properties can be manufactured at surprisingly low cost.

The base sheet layer may, generally, alternatively be denoted the substrate layer.

In case a polyester welding layer is applied, the polyester applied may be polyethylene terephthalate (PET), potentially amorphous PET (APET), which is sealable to APET, polyvinyl chloride (PVC) or polyvinylidene chloride (PVDC). In case a polypropylene (PP) or a PP/polyethylene (PP/PE) mixture welding layer is applied, the laminate is sealable to PP.

The welding layer may be of, be based on, comprise or essentially consist of polyester or polypropylene (PP), in the latter case potentially a copolymer of PP and PE. In all cases the welding layer may be of, be based on, comprise or essentially consist of a copolymer. A polyester welding layer may seal to a bottom web welding surface of, based on, comprising or essentially consisting of polyester, PET, APET, and/or PVDC. A PP or PP/PE mixture welding layer may seal to a bottom web welding surface of, based on, comprising or essentially consisting of PP.

Extrusion coating as applied in the present disclosure is a known process where a carrier foil or base sheet layer is moved between two rollers, a cooling roller and a counter roller, respectively. An additional layer, specifically a thermoplastic polymeric melt, is applied between the foil and the cooling roller in a continuous process. Upon contact with the cooling roller, the melt solidifies, and upon contact with the carrier foil, the thermoplastic melt is adhered to the carrier foil. The result is a carrier foil coated with a thin layer of a thermoplastic material. Coextrusion is a process of extruding two or more materials through a single die of an extruder so that the extrudates merge and weld together into a laminar structure before chilling or quenching. Coextrusion can be employed in film blowing, free film extrusion, extrusion lamination ("coextrusion lamination"), and extrusion coating ("coextrusion coating") processes.

Extrusion lamination as applied in the present disclosure is a known process where an extrusion lamination layer melt is applied between two rollers on which two sheets to be attached to each other are rolled. As in extrusion coating, an additional layer, specifically a thermoplastic polymeric melt, is applied between the two sheets in a continuous process. Similarly, the melt solidifies and the two foils or sheets are adhered to each other. A primer may be applied to one or both sheets before the melt is applied in order to improve adherence.

In coextrusion coating the two or more coextruded melts are extruded together from one common die and while still not having been chilled are coated onto the base sheet layer or carrier foil so that the coextruded additional layer adheres to the base sheet layer. A primer may be applied to the base sheet layer before the coextruded melt is applied to it in order to improve adherence.

It can be determined from a sheet laminate comprising a base sheet layer and a coextruded coated layer that the coated layer has been coextrusion coated onto the base sheet layer since the at least one tie layer and the welding layer will in that case adhere to the base sheet layer without a separate adhesive layer being provided between the two layers. Accordingly, "coextrusion coated" may alternatively or additionally be defined as there not being a separate adhesive layer or glue layer that includes a hardener or a hardening agent/component, present between the additional sheet layer and the base sheet layer. An adhesive or glue layer that includes a hardener or a hardening agent/component may be defined as a layer that comprises or essentially consists of a two-component adhesive or a two-component glue such as a polyurethane (PU) based adhesive/glue, available from, for example, Henkel AG, Coim Spa or Dow Chemical.

Similarly, it can be determined from a sheet laminate that it has been extrusion laminated since the two sheets which adhere to each other by means of the extrusion lamination layer will in that case adhere to sheets without a separate adhesive layer being provided between the extrusion lamination layer and the sheets. Accordingly, "extrusion laminated" may alternatively or additionally be defined as there not being a separate adhesive layer or glue layer that includes a hardener or a hardening agent/component, present between the sheets.

In the present disclosure, it may be that no further layer is included between the base sheet layer and the tie layer. Additionally, or supplementary, it may be that no further layer is included between the tie layer (or, in the case of the presence of two or more tie layers, the tie layers) and the welding layer. If several tie layers are applied, it may be that no further layers are included between the tie layers.

Furthermore, a primer may be present on the surface of the base sheet layer facing the tie layer or may have been applied to the base sheet layer before application of the tie layer on the base sheet layer. Thus, an extrusion primer may be applied to the base sheet layer between the base sheet layer and the tie layer, specifically before the coating step. The primer may be applied to the base sheet layer immediately before, i.e. 0 to 20, 1 to 10 or 2 to 7 seconds before, the step of coextrusion coating. In some embodiments, no primer is present. By choosing proper compositions of the layers, the sheet laminate may be manufactured with sufficient adhesion between the layers without the need for additional layers such as primer layers. During manufacture, the primer layer may be applied directly onto said first major surface, the coated layers subsequently being coated directly onto the primer. The primer may be solvent-based, so as to be non-soluble in water, or water-based.

One or all of the starting materials of the tie layer(s) and/or the welding layer may be in the form of or comprise granulate or granules.

A paper layer may be included on the surface of the base sheet layer positioned opposite a surface thereof facing the tie layer. The paper layer may have a distribution of 15-40, 15-30 or 20-25 $g/m^2$. A print and/or ink may be provided on a major surface of the paper layer facing away from the base sheet layer.

All layers may be distributed to have substantially uniform thickness or planar weight across substantially an entire planar extent of the sheet laminate.

The base sheet layer of the sheet laminate has a first major surface which faces the tie layer and an opposite second major surface, which second major surface may be an outer major surface for facing the environment or a paper layer. It is noted that the base sheet layer may comprise further layers such as a barrier coating and/or a protection layer forming part of the base sheet layer. These layers may be provided at either one of the two major surfaces of the base sheet layer. The base sheet layer may be manufactured in a first, separate process (such as an extrusion process) before the tie layer(s) and the welding layer of the sheet laminate are coextrusion coated thereon.

The base sheet layer may comprise, consist of or essentially consist of aluminium.

In this specification, generally, when terms such as "thickness" (measured in μm) and "distribution" (measured in g/m$^2$) are used, unless otherwise indicated, it is to be understood that the layer in question has a substantially or essentially uniform thickness across the planar extent of the layer or sheet laminate according to the stated value.

The thickness(es) or distribution(s) of the welding layer and/or the tie layer (or, in the case of several tie layers, the accumulated distribution or thickness of the tie layers) may be equal to or less than 10 μm or g/m$^2$, preferably equal to or less than 9, 8, 7, 6, 5 or 4 μm or g/m$^2$. The thickness or distribution of the at least one tie layer and/or the welding layer is preferably equal to or above 0.5, 1, 2.5 or 3 μm or g/m$^2$. This thickness or distribution is preferably 0.5-10, 1-8, 1-7, 1-6, 1-5 or 2-4 μm or g/m$^2$.

No further layer(s) need be provided on the base sheet layer top major surface. No further layer(s) need be provided beneath the welding layer, i.e. on a bottom surface of the welding layer. In some embodiments, no further layers are included in the sheet laminate besides the base sheet layer, the at least one tie layer and the welding layer, and in some embodiments the at least one tie layer only comprises at least one tie layer, such as one or two tie layers, and/or the welding layer only comprises a single layer. In some embodiments the tie layer or each of the tie layers and/or the welding layer are each only one single layer, i.e. they comprise no sublayers. Other layers may be present, such layers potentially being coextrusion coated together with the tie layer(s) and the welding layer. In some embodiments, only materials for providing an improved adhesion are provided between the base sheet layer and the welding layer of the sheet laminate.

The tie layer may comprise at least 50% by weight polyolefin, preferably at least 60, 70, 80, 90 or 95% by weight or substantially 100% by weight. A polyolefin may be defined as the class of polymers produced from a simple olefin (also called an alkene with the general formula CnH2n) as a monomer. For example, polyethylene (PE) is the polyolefin produced by polymerizing the olefin ethylene. Polypropylene (PP) is another common polyolefin which is made from the olefin propylene. The polyolefin may be, comprise or substantially consist of a thermoplastic polyolefin and/or a poly-α-olefin. The degrees of crystallinity of the polyolefin may be above 60%, 70%, 80% or 90%. The polyolefin may be, comprise or substantially consist of PE or may alternatively or additionally be, comprise or consist of PP. The polyolefin, including e.g. PE and/or PP, may be in the form of a homo-polymer or a co-polymer of the polyolefin.

The at least one tie layer may comprise an acid component, may be a copolymer or a terpolymer, potentially of, and/or be, comprise, consist of, essentially consist of or be based on a PE containing acrylate, acrylate acid, methyl acrylate, methyl acrylate acid, acrylic acid, ethylene acrylic acid (EAA), potentially an EAA co-polymer, ethylene methacrylic acid (EMAA), maleic acid anhydride (MAH), potentially an MAH containing co- or terpolymer, and/or ethylene vinyl acetate (EVA), potentially an EVA co-polymer. A potential content of one or more of these components may be equal to or above 5, 10, 15 or 20 weight %. The tie layer may additionally or alternatively be, comprise or consist of a PE containing anhydride or maleic anhydride. The anhydride or maleic anhydride content may be equal to or above 0.1, 0.2 or 0.3 weight %. The at least one tie layer may be, comprise or consist of a terpolymer of ethylene, acrylic ester and/or maleic anhydride. The melt index (MI) (190°/2.16 kg) of the tie layer material(s) may alternatively or additionally be 5 to 10 g/10 min measured according to the standard ISO 1133/ASTM 1238. The tie layer(s) may be, comprise or consist of Lotader 4503 as marketed by Arkema in January 2015 (a random terpolymer of ethylene, acrylic ester and maleic anhydride, polymerized by high-pressure autoclave process) and/or Escor 5110 as marketed by ExxonMobil in January 2015 (an ethylene acrylic acid copolymer resin). The tie layer(s) may be, comprise or consist of an ethylene vinyl acetate (EVA) and/or ethylene acrylic acid (EAA) and/or ethylene methacrylic acid (EMAA) and/or a copolymer or copolymer resin based on such materials, all potentially containing PE. The tie layer may be a mixture of the above examples.

In the case of two tie layers being present and a polyester welding layer, the tie layer adjacent the welding layer may comprise or essentially consist of a copolymer of ethylene and methacrylic acid, such as Lotader 4503 as marketed by Arkema in January 2015. The tie layer adjacent the base sheet layer may comprise or essentially consist of an EAA copolymer resin, such as Escor 5110 as marketed by ExxonMobil in January 2015.

In the case of two tie layers being present and a PP welding layer, the tie layer adjacent the base sheet layer may comprise or essentially consist of a copolymer of ethylene and methacrylic acid, potentially with 5-10 wt % methacrylic acid comonomer content, such as Nucrel 0609HSA as marketed by DuPont as of 24 Sep. 2014. The tie layer adjacent the welding layer may be of the same material as in the description of the polyester embodiment immediately above.

The welding layer may be, comprise, consist of, essentially consist of or be based on polyethylene terephtalate (PET), PP, or a mixture or copolymer of PP and PE, potentially an extrudable version of such material. The welding layer may comprise at least 50% by weight of one of these materials, preferably at least 60, 70, 80, 90 or 95% by weight or substantially 100% by weight. The PE may be HDPE or LDPE or a mixture thereof. The PET may be Skygreen PN100, a PET grade, extrudable polyester as marketed by SK Chemicals. The PP may have a density of 890-950, 890-930 or 900-920 kg/m$^2$ and/or may have an MI of 23-27 g/m$^2$. A suitable PP is WG341C as marketed by Borealis as of 7 Jul. 2015, Ed 1.

Three or more tie layers may be included in the sheet laminate according to the present disclosure.

Any and all of the above options regarding compositions, thicknesses etc. of the different layers may be combined. The same goes for the embodiments of the disclosure described below.

Generally, in this specification, when terms such as "the tie layer material" and "the welding layer material" are used, such terms are meant to indicate the material that will eventually or ultimately form the respective layer in the sheet laminate that results from a method for manufacture of the sheet laminate. Thus, for instance, the welding layer material is the initial material that is fed into an extruder, flows through the extruder and eventually is applied as the welding layer of the resultant sheet laminate. Such a layer material has a temperature before being fed, during feeding, in the different sequential zones inside the extruder, and when being coated from the die together with the tie layer(s) on the base sheet layer. Such temperature may vary during the sequence of the coextrusion coating step, the temperature of different materials may vary differently and may be different from each other in the sequential steps and/or extruder zones during the extrusion coating step. The temperature of such a material may be a maximum temperature of any part or every part or substantially any or every part of the material, especially in case an upper range limit is defined, or a minimum temperature of any or every part or substantially any or every part of the material, especially in case a lower range limit is defined. Local temperature variations of a layer material may occur. In case a single temperature is defined, such temperature may be a mean or average temperature of all parts of the material.

According to the present disclosure, a tie layer material resulting in the tie layer may be fed separately into a feed block of an extruder. In case two or more tie layers are applied, tie layer materials of each tie layer may be fed separately from each other and/or from the welding layer material.

The temperature of the welding layer material is preferably above a temperature of a tie layer material(s) in a feed zone of an extruder with which the coextrusion coating is extruded.

In the case of a polyester welding layer, preferably this temperature is equal to or less than 80, 75, 70 or 65° C. above a temperature of the tie layer material(s), and/or preferably a temperature of equal to or more than 40, 45, 50 or 55° C. above a temperature of the tie layer material(s). In case two tie layers are used, it is preferred that this temperature for the tie layer adjacent the base sheet layer is equal to or less than 20, 15 or 10° C. above a temperature of the material of the tie layer adjacent the welding layer, and/or preferably a temperature of equal to or more than 2, 5 or 8° C. above a temperature of the tie layer material adjacent the welding layer.

Similarly, in the case of a PP welding layer, preferably this temperature is equal to or less than 90, 80, 75 or 70° C. above a temperature of the tie layer material(s), and/or preferably a temperature of equal to or more than 45, 50, 55 or 60° C. above a temperature of the tie layer material(s). In case two tie layers are used, it is preferred that this temperature for the tie layer adjacent the base sheet layer is equal to or less than 30, 25 or 20° C. above a temperature of the material of the tie layer adjacent the welding layer, and/or preferably a temperature of equal to or more than 5, 10 or 12° C. above a temperature of the tie layer material adjacent the welding layer.

In another or additional embodiment, the coextrusion coating step is performed in an extruder, which comprises a feed zone. In the case of a polyester welding layer, in this feed zone a temperature of a tie layer material of a tie layer adjacent the welding layer is 100 to 120, preferably 105 to 115° C., and/or a temperature of the welding layer material is 170 to 190° C., preferably 175 to 185° C. In the case of a PP welding layer, in this feed zone a temperature of a tie layer material of a tie layer adjacent the welding layer is 125 to 145, preferably 130 to 140° C., and/or a temperature of the welding layer material is 190 to 210° C., preferably 195 to 205° C.

In another or additional embodiment, the coextrusion coating step is performed in an extruder, which comprises a transition zone. In the case of a polyester welding layer, in the transition zone a temperature of a tie layer material of a tie layer adjacent the welding layer is 160 to 190, preferably 160 to 185 or 160 to 180 or 165 to 175° C., and/or a temperature of the welding layer material is 260 to 290° C., preferably 270 to 280° C. In the case of a PP welding layer, in the transition zone a temperature of a tie layer material of a tie layer adjacent the welding layer is 185 to 205, preferably 190 to 200° C., and/or a temperature of the welding layer material is 255 to 275° C., preferably 260 to 270° C.

In another or additional embodiment, the coextrusion coating step is performed in an extruder, which comprises a metering/mixing zone. In the case of a polyester welding layer, in the metering/mixing zone a temperature of a tie layer material of a tie layer adjacent the welding layer is 270 to 300, preferably 275 to 295 or 280 to 290° C., and/or a temperature of the welding layer material is 260 to 290° C., preferably 265 to 285 or 270 to 280° C. In the case of a PP welding layer, in the metering/mixing zone a temperature of a tie layer material of a tie layer adjacent the welding layer is 250 to 315° C., preferably 255 to 310° C., and/or a temperature of the welding layer material is 295 to 325° C., preferably 300 to 320° C.

In another or additional embodiment, the coextrusion coating step is performed in an extruder, which comprises a feed block with a feed block zone. In the case of a polyester welding layer, in the feed block zone a temperature of all layer materials is 260 to 290° C., preferably 265 to 285 or 270 to 280° C. In the case of a PP welding layer, in the feed block zone a temperature of all layer materials is 300 to 320° C., preferably 305 to 315° C.

A tie layer material suitable for being coextrusion coated at the mentioned temperatures should be selected to fit the temperatures for the/each tie layer.

In case a second tie layer is present, the second tie layer being adjacent the base sheet layer, alternatively or additionally the following may apply in the case of a polyester welding layer:
in the feed zone, a temperature of the tie layer material of the second tie layer is 110 to 130° C.; and/or
in the transition zone a temperature of the tie layer material of the second tie layer is 240 to 260° C.; and/or
in the metering/mixing zone a temperature of the tie layer material of the second tie layer is 255 to 285° C.

In case a second tie layer is present, the second tie layer being adjacent the base sheet layer, alternatively or additionally the following may apply in the case of a PP welding layer:
in the feed zone, a temperature of the tie layer material of the second tie layer is 130 to 150° C.; and/or
in the transition zone a temperature of the tie layer material of the second tie layer is 190 to 210° C.; and/or
in the metering/mixing zone a temperature of the tie layer material of the second tie layer is 155 to 310° C.

Each of the tie layer material and the welding layer material melt in the extruder to become melts of the respective materials. The temperature of the material is generally defined herein as the temperature of the material when being fed, or, when it is melted, the melt. However, it may alternatively be measured at an inner surface of the apparatus enclosing a zone in which the melt flows or it may be the set temperature, which is set for a temperature zone in the extruder apparatus.

Each of the tie layer material and the welding layer material may with the method according to the disclosure generally be fed into the feed block through a respective separate feeder, which may comprise a worm or other means for transporting the materials through the feeder and into the feed block. As is common in extruders or coextruders, i.e. apparatuses for extruding sheet laminates comprising thermoplastic polymer materials, each feeder may comprise an initial feed zone, followed by a transition zone, followed by a metering/mixing zone, followed by an adapter and melt pipe zone, which leads into the feed block. Each zone may comprise one or more subzones, which may also be referred to as "zones" herein. In the feed zone the starting material fed into the feeder is softened and heated almost to the melting point. In the transition zone the material is melted to form a melt of the material, and pressure is built up. In the metering/mixing zone a uniform melt is created. In the adapter/melt pipe zone the material is transferred to the feed block. In a feed block upper zone and a feed block lower zone, structure is built up in the additional layer to be coextruded. The two melts are then coextruded from one single common die of the extruder. The feeder, the feed block, the adapter/melt pipe and/or the die may comprise one or more heaters or heating elements (and potentially coolers) that may be regulated by one or more regulators. The heaters may be set to heat the materials within the extruder to a given temperature in each of the zones. One or more of the heaters may be in the form of a mantle or casing that surrounds or encases a zone, e.g. as an outer tube. Heat energy may also be created due to friction within the extruder and especially within the feeder. When referring to a temperature within a zone in this context, reference is made to one or more of the set temperature, a mean temperature of the material or melt in the zone, a maximum temperature of the material or melt in the zone, a minimum temperature of the material or melt in the zone, a temperature measured at one point in or at the material or melt of the zone, a temperature of the heating element, and a temperature measured on or at an inside surface of the extruder in the respective zone. Usually, these temperatures will be close to each other although locally a temperature may divert with some ° C. The feed block may as mentioned comprise an upper and a lower zone, the upper zone being positioned subsequent to the adapter and melt pipe, and the lower zone leading into the die from which the coextruded melt is extruded. The die may comprise three interior zones in a transverse direction, each typically with two or three sub-zones in said transverse direction. The melts or extrudates within the die merge and weld together into a laminar structure to form the coextrusion coated layers that are applied onto the base sheet layer before chilling or quenching. Chilling or quenching is carried out by applying the coated layers or the sheet laminate onto a cooling roller in a subsequently performed coating step of the coextrusion coating process. In the coating step the two or more coextruded melts are extruded onto the base sheet layer so that the coextruded layers adhere to the base sheet layer. The coated layers and the base sheet layer are guided through a nip between the cooling roller and an opposed pressure roller and pressure may be applied between the two rollers. The welding layer preferably faces the cooling roller, the base sheet layer preferably facing the pressure roller. As mentioned, a primer or the like may be applied to the base sheet layer before the coextruded melt is applied onto it. The base sheet layer may be extruded, and/or a potential primer may be applied, immediately before the coated layers are coextrusion coated onto it, i.e. less than 60, 30, 15, 5, 4, 3, 2 or 1 seconds before.

If the extruder comprises a feeder with a feed zone, a transition zone and a metering/mixing zone, the temperature of the two (or more) materials to be coextruded may be increased during such a sequence of zones.

The tie layer material(s) may be heated through both the feed zone and the transition zone to assume a maximum temperature at or in the metering/mixing zone. The temperature of the tie layer material(s) may then be slightly lowered, in the case of a polyester welding layer e.g. with 5 to 15° C. or 8 to 12° C., and in the case of a PP welding layer e.g. with 2 to 10° C. or 3 to 7° C. on entry into or in the feed block, potentially the feed block upper zone.

Generally, in terms of the disclosure, the temperatures of the tie layer material(s) and the welding layer material are preferably different from each other in a feed zone of the extruder.

The two (or more) materials to be coextruded may be transported through a feeder using a respective worm, screw or endless screw of the respective feeder. The respective materials may be fed separately to the respective feeder and/or separately to a common feed block and/or separately to a common die.

In the case where two tie layers are applied, and the welding layer is of polyester, during transport of the respective materials in the extruder, i.e. during the course of the coextrusion coating step, the respective materials may have the following temperatures in ° C. in the above-mentioned different zones of an extruder. The temperature interval in each zone may be combined with a temperature interval in one or more of the other zones, but the preferred combination of temperature intervals is given here:

| Zone | Feed zone | Transition zone | Metering/ mixing zone | Metering/ mixing zone | Metering/ mixing zone |
| --- | --- | --- | --- | --- | --- |
| Tie layer 1 | 110-130 | 240-260 | 255-285 | 255-285 | 255-285 |
| Tie layer 2 | 100-120 | 160-180 | 270-300 | 270-300 | 270-300 |
| Welding layer | 165-195 | 260-290 | 260-290 | 260-290 | 260-290 |

| Zone | Feed block upper | Feed block lower | Die 1 | Die 2 | Die 3 |
| --- | --- | --- | --- | --- | --- |
| All layers | 260-290 | 260-290 | 260-290 | 260-290 | 260-290 |

Tie layer 1 is the tie layer adjacent the base sheet layer, whereas tie layer 2 is the tie layer adjacent the welding layer.

In embodiments where no tie layer 1 is present, i.e. the only tie layer present is the tie layer 2, the preferred temperatures are identical to the above for tie layer 2 and the welding layer.

Preferable specific approximate temperatures in ° C. are:

| Zone | Feed zone | Transition zone | Metering/ mixing zone | Metering/ mixing zone | Metering/ mixing zone |
| --- | --- | --- | --- | --- | --- |
| Tie layer 1 | 120 | 250 | 270 | 270 | 270 |
| Tie layer 2 | 110 | 170 | 285 | 285 | 285 |
| Welding layer | 180 | 275 | 275 | 275 | 275 |

| Zone | Feed block upper | Feed block lower | Die 1 | Die 2 | Die 3 |
| --- | --- | --- | --- | --- | --- |
| All layers | 275 | 275 | 275 | 275 | 275 |

Similarly, in the case where two tie layers are applied, and the welding layer is of PP, during transport of the respective materials in the extruder, said respective materials may have the following temperatures in ° C. in the above-mentioned different zones of an extruder. The temperature interval in each zone may be combined with a temperature interval in one or more of the other zones, but the preferred combination of temperature intervals is given here:

| Zone | Feed zone | Transition zone | Metering/ mixing zone | Metering/ mixing zone | Metering/ mixing zone |
|---|---|---|---|---|---|
| Tie layer 1 | 110-130 | 240-260 | 255-285 | 255-285 | 255-285 |
| Tie layer 2 | 100-120 | 160-180 | 270-300 | 270-300 | 270-300 |
| Welding layer | 165-195 | 260-290 | 260-290 | 260-290 | 260-290 |

| Zone | Feed block upper | Feed block lower | Die 1 | Die 2 | Die 3 |
|---|---|---|---|---|---|
| All layers | 260-290 | 260-290 | 260-290 | 260-290 | 260-290 |

In embodiments where no tie layer 1 is present, i.e. the only tie layer present is the tie layer 2, the preferred temperatures are identical to the above for tie layer 2 and the welding layer.

Preferable specific approximate temperatures in ° C. are:

| Zone | Feed zone | Transition zone | Metering/ mixing zone | Metering/ mixing zone | Metering/ mixing zone |
|---|---|---|---|---|---|
| Tie layer 1 | 140 | 200 | 165 | 300 | 300 |
| Tie layer 2 | 135 | 195 | 265 | 300 | 300 |
| Welding layer | 200 | 265 | 305 | 315 | 315 |

| Zone | Feed block upper | Feed block lower | Die 1 | Die 2 | Die 3 |
|---|---|---|---|---|---|
| All layers | 310 | 310 | 310 | 310 | 310 |

In an embodiment of the sheet laminate according to the disclosure, a thickness of the welding layer is less than 6 μm.

In continuation of the above explanations of the advantages of the present disclosure, it has been found that a surprisingly thin welding layer may be applied while still achieving sufficient adherence to the blister package bottom web to allow the top web to be suitably punctured. The thin welding layer according to the present embodiment thus lowers the puncture resistance of the top web, but still allows suitable adherence to the bottom web. Surprisingly, a balance may thus be achieved between these two parameters, allowing for the product within the cavities of the blister package to be extracted from the package via rupture of the top web. Surprisingly, tests have shown that such laminates have a puncture resistance low enough and an adherence strength between top and bottom webs high enough to allow for pushing the product through the top web.

The welding layer thickness may advantageously be less than 5.5, 5, 4.5, 4 or 3.5 μm and/or more than 1, 1.5, 2 or 2.5 μm. A suitable thickness interval has been found to be 1-6, 1.5-5.5, 2-5, 2-4.5, 2-4, 2.5-3.5, most preferred about 3 μm. Similar numerical values are preferred for the distribution of the welding layer measured in g/m$^2$.

In an embodiment, an accumulated distribution of the at least one tie layer and the welding layer is equal to or less than 16 g/m$^2$. Preferably, this distribution is equal to or less than 15, 14, 13, 12, 11, 10, 8, 7, 6 or 5 g/m$^2$. This distribution is preferably equal to or above 3, 4, 5, 6, 7 or 8 g/m$^2$. Preferred intervals include 3-15, 4-15, 4-12, 4-10, 4-9, 4-8, 4-7, 4-6, 4-15, 5-12, 5-10, 5-9, 5-8, 5-7 and 5-6 g/m$^2$.

In an embodiment, the sheet laminate further comprises:
a paper layer; and
at least one extrusion lamination layer provided between the base sheet layer and the paper layer;
wherein the at least one extrusion lamination layer is provided on a major surface of the base sheet layer positioned oppositely from a major surface of the base sheet layer on which the at least one tie layer is provided;
whereby the paper layer and the base sheet layer are extrusion laminated to each other by means of the at least one extrusion lamination layer.

This embodiment may make it possible to manufacture the attachment of the extrusion coated layers and the paper layer to the base sheet layer simultaneously, i.e. in one single run. Thus, the extrusion coating and the extrusion lamination can be carried out at the same time or substantially at the same time in a tandem extruder. Hereby, it is not necessary to first carry out one extrusion process and, subsequently in another extruder, the other extrusion process, which simplifies manufacture.

Surprisingly, it has been found that the balance between puncture resistance of the laminate according to the disclosure and the adherence of the welding layer to the bottom web of the blister package for allowing pushing out of the product may be achieved with attachment of a paper layer according to the present embodiment. This may especially be achieved in combination with the latter embodiment relating to the thickness of the welding layer.

The extrusion lamination layer may be, be based on, comprise or essentially consist of PE.

An accumulated distribution of the at least one extrusion lamination layer is advantageously equal to or below 15, 14, 13, 12, 11, 10, 9, 8, 7, 6 or 5 g/m$^2$. This distribution may advantageously be above 5, 6, 7, 8, 9 or 10 g/m$^2$. Advantageous intervals of this distribution include 2-15, 3-15, 4-15, 5-15, 6-14, 7-13, 8-13, 8-12 or 9-11 g/m$^2$.

In an alternative to the present embodiment, the paper layer and the base sheet layer are adhered or adhesive laminated to each other by an adhesive, which may be solvent-based, potentially two-component, i.e. comprising an adhesive and a hardener, instead of by the extrusion lamination layer. Thus, the sheet laminate according to the disclosure further comprises:
a paper layer; and
at least one adhesive lamination layer provided between the base sheet layer and the paper layer;
wherein the at least one adhesive lamination layer is provided on a major surface of the base sheet layer positioned oppositely from a major surface of the base sheet layer on which the at least one tie layer is provided;
whereby the paper layer and the base sheet layer are adhesive laminated to each other by means of the at least one adhesive lamination layer.

The adhesive may be applied with a distribution of 1-4 or 2-3, potentially 2.74 g/m$^2$, the hardener with a distribution of 0.1-0.4 or 0.2-0.3, potentially 0.26 g/m$^2$. A suitable solvent-based, two-component adhesive/hardener is LIOFOL LA 3644/LA 6055 as marketed by LOCTITE as of May 2013 and diluted with ethyl acetate.

In an embodiment, the at least one extrusion lamination layer includes two or more extrusion lamination layers, whereby the paper layer is coextrusion laminated to the base sheet layer by means of the two or more lamination layers.

A distribution of each extrusion lamination layer may be 1-10, 2-8, 3-7 or 4-6 g/m².

In a development of the present embodiment, at least two of the layers have melt indexes different from each other, wherein the extrusion lamination layer adhering to the paper layer may have a higher melt index than that adhering to the base sheet layer, which may improve adherence to the paper and base sheet layers and/or between the extrusion lamination layers.

In the case of two extrusion lamination layers being of, being based on, comprising or essentially consisting of PE, tests have shown LDPEs, potentially with respective melt indexes MI8 and ME4, to be suitable. A suitable MI4 LDPE is 23L430B as marketed by INEOS as of January 2014; a suitable MI8 LDPE is 19N430B as marketed by INEOS as of November 2007.

In an embodiment, the at least one extrusion lamination layer is, comprises, essentially consists of or is based on polyethylene.

In an embodiment, the aluminium base sheet layer is or has been annealed.

Annealing is a well-known process comprising a heat treatment that alters the physical and sometimes chemical properties of a material to increase its ductility and reduce its hardness. It usually involves heating a material to above its recrystallization temperature, maintaining a suitable temperature, and then cooling.

Annealing of aluminium foils, such as aluminium foils suitable for a base sheet layer according to the present disclosure, is also a well-known process. This process may remove oils or residues which may inhibit adherence of extruded layers. Therefore, adherence may be improved both between the tie layer and the potential extrusion lamination layer adhering to the base sheet layer, which contributes to establishing the mechanical properties of the laminate achieving the possibility of extracting the product in the blister package via pushing it out through a rupture in the laminate according to the disclosure used as a top web of a blister package.

Since annealed aluminium foils are softer than non-annealed foils, the increased resilience or elasticity of the base sheet layer may lead to increased puncture resistance so that a thinner aluminium layer may be preferred in order to lower the puncture resistance.

It has surprisingly been found that suitable mechanical properties of the laminate according to the disclosure (see the above considerations) may be achieved with thicknesses of the base sheet layer according to the following embodiment in which a thickness of the base sheet layer is less than 20 µm.

This thickness is preferably less than 19, 18, 17, 16, 15, 14, 13, 12, 11, 10, 9, 8, 6 or 7 µm and/or above 1, 2, 3, 4, 5 or 6, and more preferred between 1-20, 2-15, 3-10, 4-8, 5-7 or 6-7 µm. The presently preferred thickness is 6.35 µm.

In an embodiment, the welding layer is of, is based on, comprises or essentially consists of polyethylene terephthalate.

The polyethylene terephthalate (PET) may be an amorphous (APET) and/or a glycol-modified PET or PETG.

In an embodiment, the at least one tie layer comprises two or more tie layers.

The two or more tie layers or each tie layer may be formed in the coextrusion coating process, wherein the layer, which is adjacent to the base sheet layer, provides adherence to the base sheet layer and the layer which is adjacent to the welding layer provides adherence to the welding layer.

Similarly, the two tie layers may provide adherence to each other. The materials of the tie layers may be selected to achieve these purposes.

Accordingly, in case two tie layers are present, it is preferred that the tie layer adjacent the welding layer is, comprises, consists of or based on an MAH containing co-polymer or ter-polymer, such as Lotader 4503 as marketed by Arkema in January 2015, a PE acrylate based co-polymer or an EVA, specifically an EVA copolymer, and that the tie layer adjacent the base sheet layer is, comprises, consists of or is based on an EAA, specifically an EAA or EMAA copolymer resin, such as marketed by ExxonMobil under the trade name Escor™ 5110 as marketed by ExxonMobil in January 2015. The vinyl acetate content of a tie layer comprising EVA or of the EVA of such tie layer may be 20 to 40 or 25 to 30 wt %, the ethylene content potentially making up substantially the remaining parts of the material, i.e. 60 to 80 or 70 to 85 wt %. The acrylic acid content of a tie layer comprising EAA or of the EAA of such tie layer may be 5 to 15 or 9 to 13 wt %. This may provide sufficient adhesion of the respective layers to each other.

The thickness or distribution of one of or both of the two tie layers and/or the welding layer is preferably equal to or above 0.5, 1, 2.5 or 3 µm or g/m². This thickness or distribution is preferably 0.5-10, 1-8, 1-7, 1-6, 1-5 or 2-4 µm or g/m². In case two tie layers are present, the thicknesses or distributions of the tie layers preferably differs less than 3, 2 or 1 µm or g/m² from each other.

In an embodiment, the puncture resistance of the sheet laminate measured according to standard ASTM F1306-90 (1994), but adapted so that the sample test diameter is 48 mm instead of the 34.9 mm suggested in the standard, is less than or equal to 8 N, preferably less than or equal to 7.5, 7.0, 7, 6.8, 6.6, 6.5, 6.4, 6.3, 6.2, 6.1, 6.0, 6, 5.9, 5.8, 5.7 or 5.6 N, most preferred less than or equal to 5.5 N.

The present disclosure also involves a blister package comprising a sheet laminate according to any one of the previous claims provided as a top web of the blister package;
a blister package bottom web comprising cavities;
one or more products for consumption disposed in one or more of said cavities;
wherein the top web is arranged with a bottom surface of the welding layer facing and welded to a welding surface of the bottom web, said welding surface surrounding said cavities.

The bottom web or a welding surface thereof may be manufactured from polyester, PET, PP or a PP/PE mixture, PVC and/or PVDC or comprise an outer welding layer comprising one of these materials or another material to which it is suitable to weld the welding layer.

The bottom web or a welding surface thereof may be identical to that of the welding layer of the sheet laminate or top web.

In another aspect, the present disclosure involves a method for manufacture of a sheet laminate according to any one of the above embodiments, comprising the steps of:
providing the aluminium base sheet layer; and
coextrusion coating said at least one tie layer and said welding layer onto said base sheet layer, so that the tie layer is disposed between the base sheet layer and the welding layer, whereby the welding layer is attached to the base sheet layer by means of the tie layer.

In a development of the present aspect, the method comprises the manufacture of a blister package, comprising the steps of:
providing a sheet laminate according to any one of the above embodiments as a top web of the blister package;

providing a blister package bottom web comprising cavities and a welding surface surrounding said cavities;

disposing one or more products for consumption in one or more of said cavities;

arranging the top web with a bottom surface of the welding layer facing the welding surface of the bottom web; and welding the sheet laminate to the welding surface of the bottom web.

The top web may be cut or punched to the size of the blister package before or after being welded to the bottom web.

A cavity of the blister package may subsequently be opened by pushing, e.g. with a finger, on a bottom surface of the cavity against the top web portion above the cavity with enough force to puncture this top web portion so that the product held in the cavity can be pushed out through the punctured opening of the top web portion.

In an embodiment of the method according to the disclosure, the method further comprises the steps of:

attaching a paper layer to the base sheet layer by means of extrusion lamination by extruding at least one extrusion lamination layer between the base sheet layer and the paper layer;

wherein the steps of attaching the paper layer and the extrusion coated layers to the base sheet layer are carried out simultaneously or in one single run.

The latter steps may advantageously be carried out by means of a tandem extruder, which is an extruder type that makes it possible to carry out the extrusion lamination step and the extrusion coating step simultaneously or in one single run on the two respective major surfaces of the base sheet layer.

FIELD OF THE DISCLOSURE

Embodiments of the disclosure will be described in the following detailed description with reference to the drawings in which.

DETAILED DESCRIPTION

Figure 1:
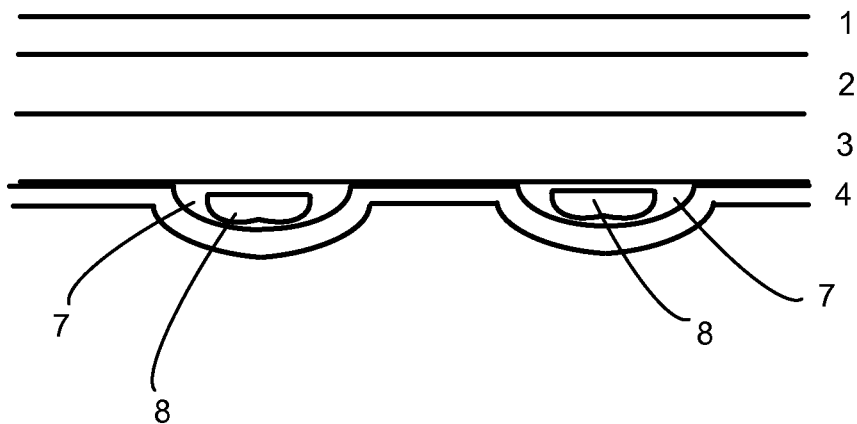
FIG. 1 is a schematic sectional side view of an embodiment of a sheet laminate according to the present disclosure attached to a bottom web so as to form a blister package.

FIG. 1 shows an embodiment of a sheet laminate according to the present disclosure, which sheet laminate is for being used as a puncturable top web for a blister package. The laminate comprises an annealed aluminium base sheet layer 1, a tie layer 2 based on polyolefin, especially PE, and a welding layer 3 based on polyester. Alternatively, the welding layer 3 can be based on PP or a PP/PE mixture.

The welding layer 3 and the tie layer 2 are coextrusion coated on the base sheet layer 1 so that the tie layer 2 is disposed between the base sheet layer 1 and the welding layer 3, whereby the welding layer 3 is attached to the base sheet layer 1 by means of the tie layer 2.

The polyester welding layer is of APET and/or PETG, which is sealable to a bottom web or a welding surface thereof of PET, APET, GPET, PVC and PVDC. In case a polypropylene (PP) or a PP/polyethylene (PP/PE) mixture welding layer is applied, the laminate is sealable to PP.

The sheet laminate is sealed or welded to a bottom web welding surface of a bottom web 4 of APET.

The base sheet layer 1 has a first major surface which faces the tie layer 2 and an opposite second major surface, which is an outer major surface facing the environment. The base sheet layer 1 is manufactured in a first, separate process (such as an extrusion process) before the tie layer 2 and the welding layer 3 are coextrusion coated thereon, see further below.

In general, all layers of the variations of the sheet laminate as described with reference to the drawings are each distributed to have substantially uniform thickness or planar weight across substantially an entire planar extent of the sheet.

The distribution of the welding layer 3 is 3 $g/m^2$, and that of the tie layer 2 is 3.5 $g/m^2$. The thickness of the welding layer is 3 µm. The thickness of the base sheet layer is 6.35 µm.

The tie layer 2 is of Lotader 4503 as marketed by Arkema in January 2015. The welding layer 3 is of Skygreen PN100 as marketed by SK Chemicals.

The blister package resultant from the layers 1, 2, 3, 4 shown in FIG. 1 comprises the sheet laminate provided as a top web of the blister package and welded to the bottom web 4. The bottom web 4 is a conventional bottom web comprising a number of cavities 7, each containing a product 8 for consumption, such as a medicinal pill, positioned within the cavity 7.

The sheet laminate or top web is arranged with a bottom surface of the welding layer 3 facing and welded to an upper welding surface of the bottom web 4, said welding surface surrounding said cavities 7 on all sides.

The sheet laminate of FIG. 1 is manufactured by an embodiment of a method for manufacture according to the present disclosure, comprising the steps of, in sequence:

providing the aluminium base sheet layer 1 from a roll of extruded, annealed aluminium foil; and coextrusion coating the tie layer 2 and the welding layer 3 onto the base sheet layer 1, whereby the welding layer 3 is attached to the base sheet layer 1 by means of the tie layer 2.

The extrusion coating step is carried out in a conventional extruder in accordance with the above general description of the present disclosure. The extruder comprises a die for extrusion of the coextrusion coated layers 2, 3. The extruder comprises a feed zone, a transition zone, a metering/mixing zone, and a feed block with a feed block zone, as is conventional within the art.

The blister package shown in FIG. 1 is then manufactured by the subsequent steps of:

unrolling from a roll the sheet laminate as a top web of the blister package;

unrolling from a roll the blister package bottom web 4;

disposing individual products 8 for consumption in each of the cavities 7;

arranging the sheet laminate or top web with its bottom surface of the welding layer 3 facing the upper welding surface of the bottom web 4;

welding the sheet laminate to the welding surface of the bottom web 4;

cutting out or punching suitably sized blister packages from the webs welded together.

These steps are carried out in a conventional manner.

Figure 2:
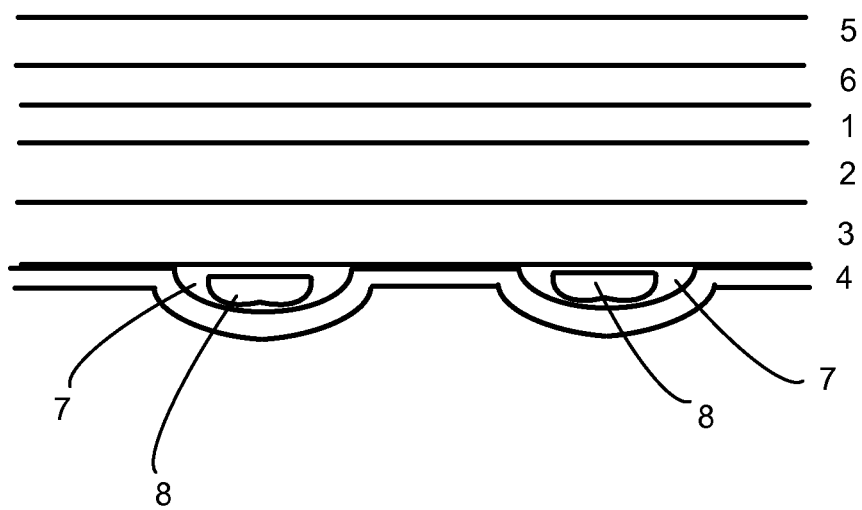
FIG. 2 is a view similar to that of FIG. 1 of another embodiment a sheet laminate according to the present disclosure attached to a bottom web so as to form a blister package.

FIG. 2 shows another embodiment, which is identical to that of FIG. 1, except for a paper layer 5 being included. A print and/or ink may be provided on a major surface of the paper layer 5 facing away from the base sheet layer 1. The paper layer 5 is attached to the base sheet layer 1 by means of a solvent-based adhesive lamination layer 6. This adhesive lamination layer 6 is of adhesive/hardener LIOFOL LA 3644/LA 6055 as marketed by LOCTITE as of May 2013 and diluted with ethyl acetate. The adhesive is applied with a distribution of 2.74 g/m², the hardener with a distribution of 0.26 g/m². During manufacture of the sheet laminate, the coextrusion coating of layers 2 and 3 and the adhesion of the base sheet layer 1 to the paper layer 5 are carried out in separate steps. The adhesion is carried out first and in a conventional manner. Between the coextrusion coating and the adhesion steps, a drying or hardening time is applied to make it possible to carry out the other of the two steps.

The embodiment of the blister package shown in FIG. 2 is manufactured in a manner similar to that of FIG. 1. However, subsequent to manufacture of the sheet laminate shown in FIG. 1, and before manufacture of the blister package, the sheet laminate of FIG. 1 is unrolled from a roll so as to adhere the paper layer 5 to the base sheet layer 1 by means of application of the adhesive lamination layer 6 in a conventional manner.

Figure 3:
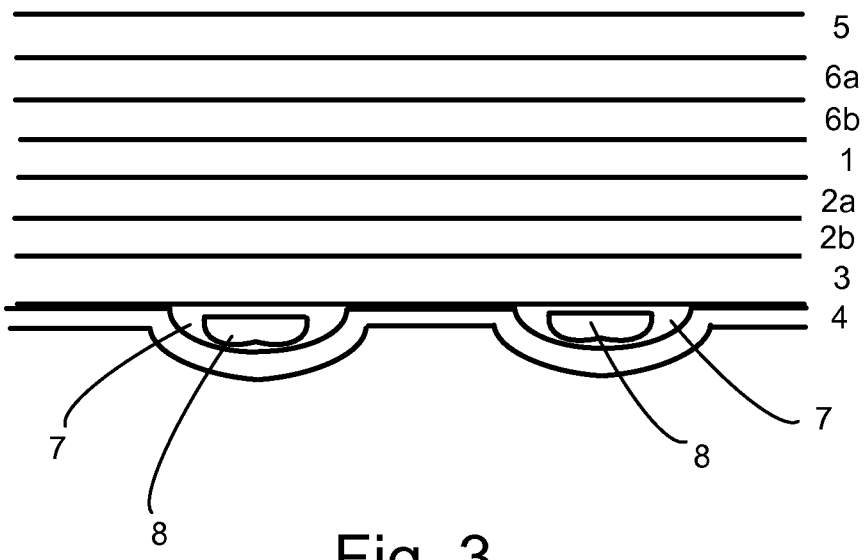
FIG. 3 is a view similar to that of FIG. 1 of another embodiment a sheet laminate according to the present disclosure attached to a bottom web so as to form a blister package.

FIG. 3 shows yet another embodiment, which is identical to that of FIG. 2, except for the following differences: Two tie layers 2a and 2b are applied in the coextrusion coating instead of the one tie layer 2 of FIG. 2, and the paper layer 5 is extrusion laminated to the base sheet layer by extrusion lamination by means of two extrusion lamination layers 6a, 6b.

The tie layer 2b consists of Lotader 4503 as marketed by Arkema in January 2015. The tie layer 2a consists of Escor™ 5110 as marketed by ExxonMobil in January 2015. The distribution of tie layer 2b is 2 g/m², and that of the tie layer 2a is 1.5 g/m².

The extrusion lamination layers 6a, 6b consist of PE MI 8 and PE MI4, respectively. The thickness of each layer 6a, 6b is 5 g/m².

The embodiment of the blister package shown in FIG. 3 is manufactured in a manner similar to that of FIG. 1. However, during manufacture of the sheet laminate, the extrusion lamination step and the extrusion coating step are carried out in one single run in a conventional tandem extruder in accordance with the above general description of the present disclosure. The tandem extruder comprises two extruders, one comprising a die for extrusion of the coextrusion coated layers 2a, 2b, 3 and another for extrusion of the extrusion lamination layers 6a, 6b. Each extruder comprises a feed zone, a transition zone, a metering/mixing zone, and a feed block with a feed block zone, as is conventional within the art. The extrusion lamination is carried out first, and the extrusion coating subsequently.

During transport of the respective materials in the coextrusion coating extruder, i.e. during the course of the coextrusion coating step, the respective materials maintain the following temperatures in ° C. in the above-mentioned different zones of the extruder.

| Zone | Feed zone | Transition zone | Metering/ mixing zone | Metering/ mixing zone | Metering/ mixing zone |
|---|---|---|---|---|---|
| Layer 2a | 120 | 250 | 270 | 270 | 270 |
| Layer 2b | 110 | 170 | 285 | 285 | 285 |
| Layer 3 | 180 | 275 | 275 | 275 | 275 |

| Zone | Feed block upper | Feed block lower | Die 1 | Die 2 | Die 3 |
|---|---|---|---|---|---|
| All layers | 275 | 275 | 275 | 275 | 275 |

In the embodiments of FIGS. 1 and 2, where only a single tie layer 2 is present, the extrusion temperatures with respect to the tie layer 2 are identical to the tie layer 2b above. The temperatures with regard to the welding layer 3 are also identical.

In an embodiment alternative to that of FIG. 3, the PET welding layer 3 is replaced by a PP welding layer 3. This alternative embodiment and the manufacture thereof is similar to that of FIG. 3 except for the following differences. Reference is made to FIG. 3 since the schematic layer structure is identical, but the layer materials are different.

As in the embodiment of FIG. 3, the paper layer 5 is extrusion laminated to the base sheet layer 1 by extrusion lamination using the two extrusion lamination layers 6a, 6b.

Two tie layers 2a and 2b are applied in the coextrusion coating. The tie layer 2a is replaced to consist of Nucrel 0609, a PE copolymer comprising EMAA which is selected due to the higher temperature with which the welding layer 3 is extruded, see below. The material of tie layer 2b is identical to that of tie layer 2b in the embodiment of FIG. 3 as described above. The distribution of the tie layers 2a, 2b is identical to the embodiment of FIG. 3.

The extrusion lamination layers 6a, 6b consist of PE MI 8 and PE MI4, respectively. The thickness of each layer 6a, 6b is 5 g/m².

The present alternative embodiment of the blister package is manufactured in a manner similar to that of FIG. 3.

During transport of the respective materials in the coextrusion coating extruder, i.e. during the course of the coextrusion coating step, the respective materials maintain the following temperatures in ° C. in the above-mentioned different zones of the extruder.

| Zone | Feed zone | Transition zone | Metering/ mixing zone | Metering/ mixing zone | Metering/ mixing zone |
|---|---|---|---|---|---|
| Layer 2a | 140 | 200 | 165 | 300 | 300 |
| Layer 2b | 135 | 195 | 265 | 300 | 300 |
| Layer 3 | 200 | 265 | 305 | 315 | 315 |

| Zone | Feed block upper | Feed block lower | Die 1 | Die 2 | Die 3 |
|---|---|---|---|---|---|
| All layers | 310 | 310 | 310 | 310 | 310 |

Figure 4:
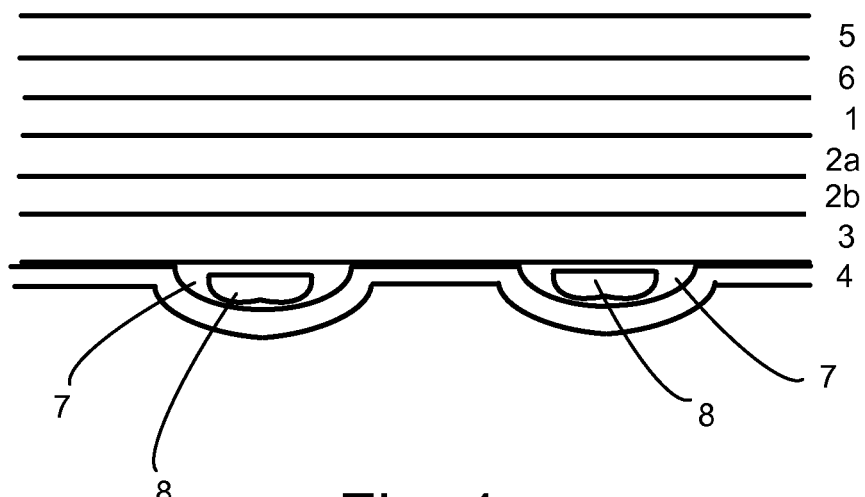
FIG. 4 is a view similar to that of FIG. 1 of another embodiment a sheet laminate according to the present disclosure attached to a bottom web so as to form a blister package.

FIG. 4 shows yet another embodiment, which is identical to that of FIG. 3, except for the following differences: Only a single extrusion lamination layer 6 of PE MI 8 is included, distribution 10 g/m².

As in the embodiment of FIG. 3, the tie layer 2b consists of Lotader 4503 as marketed by Arkema in January 2015. The tie layer 2a consists of Escor™ 5110 as marketed by ExxonMobil in January 2015. The distribution of tie layer 2b is 2 g/m², and that of the tie layer 2a is 1.5 g/m².

In the present embodiment, the laminate is manufactured in a manner similar to that of FIG. 3, i.e. the layers 5 and 1 are laminated to each other in a first process and, subsequently, the layers 2a, 2b and 3 are coextrusion coated on the layer 1 in a second, separate, process. The second process is similar to that described above in connection with the embodiment of FIG. 1.

In a not shown alternative to the embodiment of FIG. 3, which is comparable to the embodiment of FIG. 1, the layers 5, 6a and 6b are not included in the laminate.

Similarly, in a not shown alternative to the embodiment of FIG. 4, which is comparable to the embodiment of FIG. 1, the layers 5 and 6 are not included in the laminate.

EXAMPLES

Samples no. 1-7 of the sheet laminate according to FIG. 3 were manufactured. An analysis of the puncture resistance of each Sample was then performed. A similar analysis was also performed on comparison Samples no. 8-10.

Initially, a laminate consisting of layers 1, 5, 6a and 6b of FIG. 3 was produced according to the above description, i.e. layers 1 and 5 were extrusion laminated to each other by means of layers 6a, 6b. Layer 5 was a layer of paper type LB 002, revision 02 of 22 Jun. 2012 marketed by LENK Paper, distribution 23 g/m², which is referred to as "Pap23" in the following. Layer 6a was of 23L430B as marketed by INEOS as of January 2014, and layer 6b was of 19N430B as marketed by INEOS as of November 2007, each of distribution 5 g/m². Layer 1 was an annealed Al layer with a thickness of 6.35 µm. This laminate is referred to as "Pap23/PE10/AL6.35" in the following.

Samples 1-7 were produced with different distributions of coextrusion coated layers 2a, 2b and 3 according to the embodiment of FIG. 3 on the laminate Pap23/PE10/AL6.35. As described in connection with the embodiment of FIG. 3 above, the tie layer 2b consisted of Lotader 4503 as marketed by Arkema in January 2015. The tie layer 2a consisted of Escor™ 5110 as marketed by ExxonMobil in January 2015. The welding layer 3 was of Skygreen PN100. The coextrusion coated layers 2a, 2b, 3 are denoted "CoexPET" in the following.

In all Samples no. 1-7 and 10, the extrusion lamination was carried out in a first extrusion process to produce a laminate of layers 5, 6a, 6b and 1. The coextrusion coating of layers 2a, 2b3 a and 4 was then carried out subsequently.

The distribution of CoexPET in Samples 1-7 is shown below.

| Sample no. | Coex PET [g/m²] |
|---|---|
| 1 | 59.21 |
| 2 | 29.94 |
| 3 | 15.98 |
| 4 | 10.33 |
| 5 | 7.66 |
| 6 | 5.63 |
| 7 | 5.09 |

The analysis method applied for determination of puncture resistance of the manufactured laminates was according to standard ASTM F1306-90 as reapproved 1994, but adapted so that the sample test diameter was 48 mm instead of the 34.9 mm suggested in the standard's item 5.4.1. Accordingly, the puncture resistance (force to break) was measured in Newtons, N.

For comparison, in Sample no. 8, puncture resistance was measured for the laminate Pap23/PE10/AL6.35 without CoexPET; and in Sample no. 9, puncture resistance was measured for 20 µm hard (non-annealed) Al with no other layers included.

Puncture resistance was also measured for Sample no. 10, which was a laminate similar to those of Samples no. 1-7, i.e. including CoexPET. However, in Sample no. 10, Pap23/PE10/AL6.35 was replaced by a laminate of layers 5, 6 and 1 manufactured according to the embodiment of FIG. 2 above, i.e. including an adhesive lamination layer 6 of a solvent-based adhesive/hardener, specifically LIOFOL LA 3644/LA 6055 as marketed by LOCTITE as of May 2013 diluted with ethyl acetate. The distribution of layer 3 (the PET welding layer) of CoexPET was selected to 3 g/m² in Sample no. 10. This laminate is denoted "Pap23/Al6.35/CoexPET6.5" in the following.

The ratio between the distributions of tie layer 2a to 2b to 3 was about 1.5 to 2 to 3 in all of samples 1-7 and 10 so that the distribution of layer 2a was about 1.5/6.5×total distribution of CoexPET, that of layer 2b was about 2/6.5×total distribution of CoexPET, and that of layer 3 was about 3/6.5×total distribution of CoexPET. For example, in sample 1, the total distribution of CoexPET was about 59.21 g/m², that of layer 2a was about 13.71 g/m², that of layer 2b was about 18.27 g/m², and that of layer 3 was about 27.24 g/m².

Pieces of the laminates of Samples no. 1-7 and 10 were welded as top webs to blister pack APET (APET type Sky 125 from manufacturer Skylight) bottom webs similar to the web 4 of the embodiment of FIG. 3 to produce blister packs as shown in FIG. 3 comprising one chewing gum tablet 8 in each cavity 7 of the blister pack bottom web 4. The welding parameters were 160° C., 3.7 bar for 1.6 seconds.

It was then tested if the tablets 8 could be satisfactorily pushed through the sheet laminate top web by means of a finger of a hand. It was found that a satisfactory puncture resistance of the laminate was less than or equal to 6 N although a puncture resistance of up to about 7.5 N was evaluated to be acceptable.

A puncture resistance of about 5.5 to 6 N was evaluated to be optimal. In all of Samples no. 1-7 and 10, the adherence of layer 3 to layer 4 was sufficient to allow for the welding strength not to be so low as to negatively influence the possibility to push out the tablets 8.

The results from the experiments are shown below.

| Sample no. | CoexPET distribution [g/m²] | Layer 3 distribution [g/m²] | Puncture resistance [N] |
|---|---|---|---|
| 1 | 59.21 | 27.24 | 13.8 |
| 2 | 29.94 | 13.77 | 7.8 |
| 3 | 15.98 | 7.35 | 6.0 |
| 4 | 10.33 | 4.75 | 5.6 |
| 5 | 7.66 | 3.52 | 5.5 |
| 6 | 5.63 | 2.58 | 5.0 |
| 7 | 5.09 | 2.34 | 5.4 |

| Sample no. | Laminate/layer | Layer 3 distribution [g/m²] | Puncture resistance [N] |
|---|---|---|---|
| 8 | Pap23/PE10/AL6.35 | — | 5.2 |
| 9 | hard Al 20 μm | — | 3.2 |
| 10 | Pap23/Al6.35/CoexPET6.5 | 3 | 5.9 |

Figure 5:
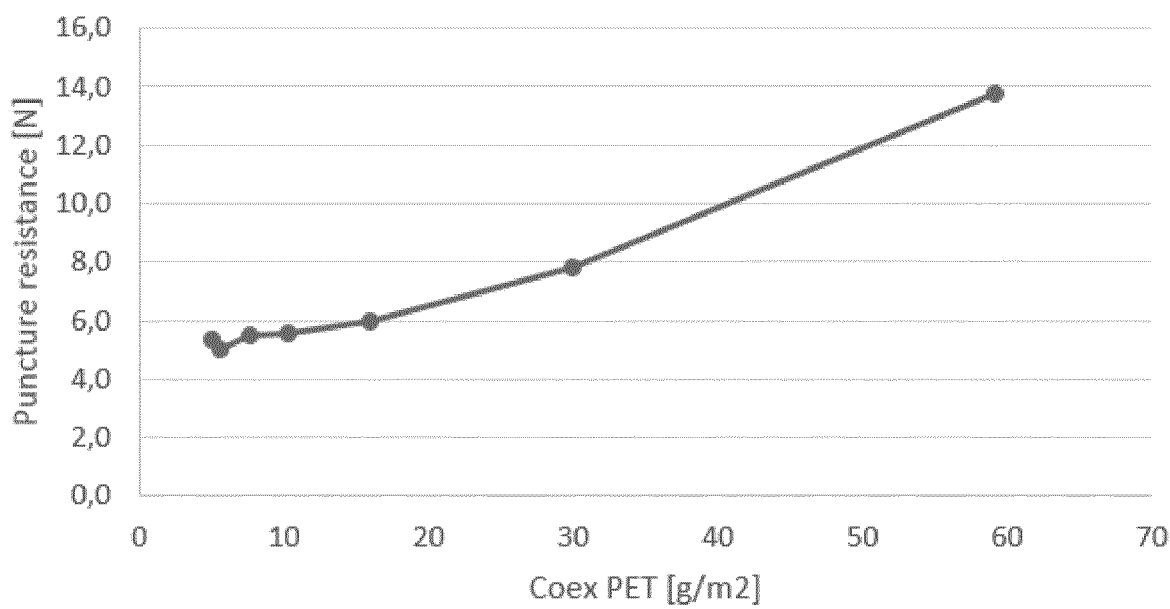
FIG. 5 shows a curve illustrating puncture resistance as a function of distribution of a coextrusion coated layer in samples of a laminate according to FIG. 4.

FIG. 5 shows the measured puncture resistance in Samples no. 1-7 as a function of the accumulated distribution of CoexPET.

Figure 6:
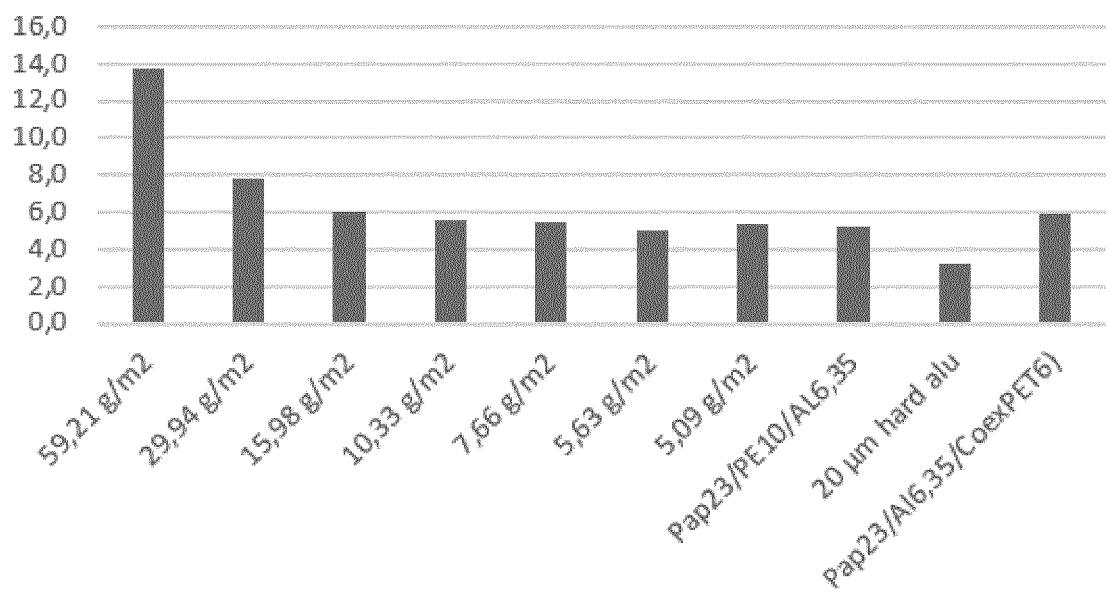
FIG. 6 shows a column diagram of puncture resistance of different samples of laminates.

FIG. 6 shows the measured puncture resistance of each of the Samples no. 1-10.

The tests show that when the distribution of CoexPET is at or below approximately 16 g/m², the puncture resistance of the laminate is equal to or less than about 6 N. When the distribution of CoexPET is at or below approximately 10 g/m², the puncture resistance of the laminate is less than 6 N. Comparably, the puncture resistance of Sample no. 8 was measured to 5.2 N.

Thus, it has surprisingly been shown that a coextrusion coated PET welding layer can be included in a sheet laminate for being used as a top web for a blister package while achieving a satisfactorily low puncture resistance. Furthermore, it has surprisingly been shown that inclusion of the coextrusion coated welding layer does not significantly increase the puncture resistance of the laminate as long as the welding layer has a relatively low distribution, i.e. is relatively thin. The equipment used for manufacture did not allow for applying a thinner welding layer, but it can be expected that the welding layer distribution can be decreased even further while still allowing sufficient welding adherence to the bottom web. Furthermore, the puncture resistance was low enough to allow for satisfactory manual extraction of the tablets contained within the cavities by manually forcing rupture of the laminate.

The puncture resistance of Sample no. 10 was measured to be somewhat higher than what it would be in a laminate according to Samples no. 1-7 having a similar CoexPET distribution. Nonetheless, it has been shown that a suitable puncture resistance may also be achieved using a solvent-based adhesive in accordance with the embodiment of FIG. 2.

Based on the variation of the distribution of CoexPET in the experiments, it is expected that the accumulated distribution of the extrusion lamination layers 6a, 6b of FIG. 3 can be increased to about 15 g/m² while maintaining a desired puncture resistance of the resultant sheet laminate.

Further Samples no. 11-17 were manufactured according to the above embodiment described as an alternative to the embodiment of FIG. 3, i.e. where the PET welding layer 3 is replaced with a PP welding layer 3, specifically of WG341C as marketed by Borealis as of 7 Jul. 2015, Ed 1. Otherwise, the Samples were manufactured and the tests performed identically to Samples no. 1-10 above. The resultant coextruded layers 2a, 2b, 3 are denoted "CoexPP" in the following.

The results from the experiments are shown below.

| Sample no. | CoexPP distribution [g/m²] | Layer 3 distribution [g/m²] | Puncture resistance [N] |
|---|---|---|---|
| 11 | 51.1 | 23.58 | 8.3 |
| 12 | 30 | 13.85 | 7.2 |
| 13 | 13.65 | 6.30 | 6.3 |
| 14 | 8.6 | 3.97 | 6.2 |
| 15 | 6.2 | 2.86 | 6.2 |
| 16 | 5.1 | 2.35 | 6.2 |
| 17 | 4.83 | 2.23 | 5.9 |

The tests show that when the distribution of CoexPP is at or below approximately 14 g/m², the puncture resistance of the laminate is equal to or less than about 6 N. When the distribution of CoexPP is at or below approximately 5 g/m², the puncture resistance of the laminate is less than 6 N.

Thus, it has surprisingly been found that a coextrusion coated PP welding layer can be included in a sheet laminate for being used as a top web for a blister package while achieving a satisfactory puncture resistance. Furthermore, it has surprisingly been shown that inclusion of the coextrusion coated welding layer does not significantly increase the puncture resistance of the laminate as long as the welding layer has a relatively low distribution, i.e. is relatively thin. The equipment used for manufacture did not allow for applying a thinner welding layer, but it can be expected that the welding layer distribution can be decreased even further while still allowing sufficient welding adherence to the bottom web. Furthermore, the puncture resistance was low enough to allow for satisfactory manual extraction of the tablets contained within the cavities by manually forcing rupture of the laminate.

Accordingly, the balance between puncture resistance of the laminates manufactured according to the disclosure and the adherence of the PET and PP welding layers to the bottom web of the blister package for allowing pushing out of the product can be achieved with sheet laminates according to the disclosure.

What is claimed is:

1. A sheet laminate for being used as a puncturable top web for a blister package, comprising:
    an aluminum base sheet layer, wherein the aluminum base sheet layer has a thickness of less than 10 μm and is annealed;
    at least one tie layer consisting essentially of polyolefin; and
    a welding layer consisting essentially of one or more polyesters;
    wherein the welding layer and the at least one tie layer are coextrusion coated on the aluminum base sheet layer so that the at least one tie layer is disposed between the aluminum base sheet layer and the welding layer, and wherein the welding layer is attached to the aluminum base sheet layer by the at least one tie layer,
    wherein an accumulated distribution of the at least one tie layer and the welding layer is equal to or less than 10 g/m², and
    wherein a puncture resistance of the sheet laminate is less than or equal to 8 N, the puncture resistance of the sheet laminate being measured according to standard ASTM F1306-90 (1994), adapted so that a sample test diameter is 48 mm.

2. The sheet laminate according to claim 1, further comprising:
    a paper layer; and
    at least one extrusion lamination layer provided between the aluminum base sheet layer and the paper layer;

wherein the at least one extrusion lamination layer is provided on a major surface of the aluminum base sheet layer positioned oppositely from a major surface of the aluminum base sheet layer on which the at least one tie layer is provided;

whereby the paper layer and the aluminum base sheet layer are extrusion laminated to each other by means of the at least one extrusion lamination layer.

3. The sheet laminate according to claim 2, wherein the at least one extrusion lamination layer includes two or more extrusion lamination layers, whereby the paper layer is coextrusion laminated to the aluminum base sheet layer by means of the two or more extrusion lamination layers.

4. The sheet laminate according to claim 2, wherein the at least one extrusion lamination layer comprises polyethylene.

5. The sheet laminate according to claim 1, further comprising:
a paper layer; and
at least one adhesive lamination layer provided between the aluminum base sheet layer and the paper layer;
wherein the at least one adhesive lamination layer is provided on a major surface of the aluminum base sheet layer positioned oppositely from a major surface of the aluminum base sheet layer on which the at least one tie layer is provided;
whereby the paper layer and the aluminum base sheet layer are adhesive laminated to each other by means of the at least one adhesive lamination layer.

6. The sheet laminate according to claim 1, wherein the one or more polyesters of the welding layer comprises polyethylene terephthalate.

7. The sheet laminate according to claim 1, wherein the at least one tie layer comprises two or more tie layers.

8. The sheet laminate according to claim 1, wherein the aluminum base sheet layer has a thickness in a range of 2 μm to 10 μm.

9. A blister package comprising:
a sheet laminate provided as a top web of the blister package, which sheet laminate comprises:
an aluminum base sheet layer, wherein the aluminum base sheet layer has a thickness of less than 10 μm and is annealed,
at least one tie layer consisting essentially of polyolefin, and
a welding layer consisting essentially of one or more polyesters,
wherein the welding layer and the at least one tie layer are coextrusion coated on the aluminum base sheet layer so that the at least one tie layer is disposed between the aluminum base sheet layer and the welding layer, and wherein the welding layer is attached to the aluminum base sheet layer by the at least one tie layer,
wherein an accumulated distribution of the at least one tie layer and the welding layer is equal to or less than 10 g/m$^2$, and
wherein a puncture resistance of the sheet laminate is less than or equal to 8 N, the puncture resistance of the sheet laminate being measured according to standard ASTM F1306-90 (1994), adapted so that a sample test diameter is 48 mm;
a bottom web comprising cavities; and
one or more products for consumption disposed in one or more of said cavities;
wherein the top web is arranged with a bottom surface of the welding layer facing and welded to a welding surface of the bottom web, said welding surface surrounding said cavities.

10. The blister package according to claim 9, wherein the sheet laminate further comprises:
a paper layer; and
at least one extrusion lamination layer provided between the aluminum base sheet layer and the paper layer;
wherein the at least one extrusion lamination layer is provided on a major surface of the aluminum base sheet layer positioned oppositely from a major surface of the aluminum base sheet layer on which the at least one tie layer is provided;
whereby the paper layer and the aluminum base sheet layer are extrusion laminated to each other by the at least one extrusion lamination layer.

11. The blister package according to claim 10, wherein the at least one extrusion lamination layer includes two or more extrusion lamination layers, whereby the paper layer is coextrusion laminated to the aluminum base sheet layer by means of the two or more extrusion lamination layers.

12. The blister package according to claim 10, wherein the at least one extrusion lamination layer comprises polyethylene.

13. The blister package according to claim 9, wherein the sheet laminate further comprises:
a paper layer; and
at least one adhesive lamination layer provided between the aluminum base sheet layer and the paper layer;
wherein the at least one adhesive lamination layer is provided on a major surface of the aluminum base sheet layer positioned oppositely from a major surface of the aluminum base sheet layer on which the at least one tie layer is provided;
whereby the paper layer and the aluminum base sheet layer are adhesive laminated to each other by the at least one adhesive lamination layer.

14. The blister package according to claim 9, wherein a thickness of the aluminum base sheet layer is less than 7 μm.

15. The blister package according to claim 9, wherein the one or more polyesters of the welding layer comprises polyethylene terephthalate.

16. The blister package according to claim 9, wherein the at least one tie layer comprises two or more tie layers.

17. A method for manufacture of a sheet laminate comprising:
providing an aluminum base sheet layer, wherein the aluminum base sheet layer has a thickness of less than 10 μm and is annealed; and
coextrusion coating at least one tie layer and welding layer onto said aluminum base sheet layer, so that the at least one tie layer is disposed between the aluminum base sheet layer and the welding layer, wherein:
the welding layer is attached to the aluminum base sheet layer by the at least one tie layer,
the at least one tie layer consists essentially of polyolefin and the welding layer consists essentially of one or more polyesters,
an accumulated distribution of the at least one tie layer and the welding layer is equal to or less than 10 g/m$^2$, and
a puncture resistance of the sheet laminate is less than or equal to 8 N, the puncture resistance of the sheet laminate being measured according to standard ASTM F1306-90 (1994), adapted so that a sample test diameter is 48 mm.

18. The method according to claim 17, further comprising:
- attaching a paper layer to the aluminum base sheet layer by extrusion lamination by extruding at least one extrusion lamination layer between the aluminum base sheet layer and the paper layer;
- wherein attaching the paper layer and the extrusion coated layers to the aluminum base sheet layer are carried out simultaneously or in one single run.

* * * * *